United States Patent
Zhang

(10) Patent No.: US 11,741,339 B2
(45) Date of Patent: Aug. 29, 2023

(54) DEEP NEURAL NETWORK-BASED METHOD AND DEVICE FOR QUANTIFYING ACTIVATION AMOUNT

(71) Applicant: HANGZHOU HIKVISION DIGITAL TECHNOLOGY CO., LTD., Hangzhou (CN)

(72) Inventor: Yuan Zhang, Hangzhou (CN)

(73) Assignee: Hangzhou Hikvision Digital Technology Co., Ltd., Hangzhou (CN)

(*) Notice: Subject to any disclaimer, the term of this patent is extended or adjusted under 35 U.S.C. 154(b) by 562 days.

(21) Appl. No.: 16/649,562

(22) PCT Filed: Sep. 5, 2018

(86) PCT No.: PCT/CN2018/104177
§ 371 (c)(1),
(2) Date: Mar. 20, 2020

(87) PCT Pub. No.: WO2019/056946
PCT Pub. Date: Mar. 28, 2019

(65) Prior Publication Data
US 2020/0285933 A1   Sep. 10, 2020

(30) Foreign Application Priority Data
Sep. 21, 2017 (CN) .......................... 201710859537.7

(51) Int. Cl.
*G06N 3/04*      (2023.01)
*G06N 3/063*     (2023.01)
(Continued)

(52) U.S. Cl.
CPC ...................... *G06N 3/04* (2013.01)

(58) Field of Classification Search
CPC .......................... G06N 3/0472; H04N 19/192
See application file for complete search history.

(56) References Cited

U.S. PATENT DOCUMENTS

2014/0286403 A1* 9/2014 Nishitani ............. H04N 19/124
                                                             375/240.03
2016/0150230 A1* 5/2016 He .................... H04N 19/124
                                                             375/240.03
(Continued)

FOREIGN PATENT DOCUMENTS

CN    106203624 A    12/2016
CN    106485316 A     3/2017
(Continued)

OTHER PUBLICATIONS

International Search Report issued is corresponding application No. PCT/CN2018/104177, dated Nov. 23, 2018, 2 pages.
(Continued)

*Primary Examiner* — Getente A Yimer
(74) *Attorney, Agent, or Firm* — Meunier Carlin & Curfman LLC

(57) ABSTRACT

A method and an apparatus for quantizing an activation volume of a deep neural network are disclosed. The method includes: obtaining an activation volume of a network layer in the deep neural network (S101), wherein elements in the activation volume are arranged in three directions: height, width, and depth; dividing depth segments in the activation volume in which a difference among element features is smaller than a preset threshold into a same slice group along the depth direction of the activation volume, so as to obtain a plurality of slice groups (S102); quantizing each slice group respectively by using a quantization parameter corresponding to each slice group obtained through a quantization formula (S103). The quantization error can be reduced through the above method.

9 Claims, 3 Drawing Sheets

(51) Int. Cl.
*G06N 3/08* (2023.01)
*G06N 3/06* (2006.01)

(56) References Cited

U.S. PATENT DOCUMENTS

| | | | | |
|---|---|---|---|---|
| 2016/0189001 A1* | 6/2016 | Chiu | ............... | G06V 20/20 382/165 |
| 2016/0328646 A1 | 11/2016 | Lin et al. | | |
| 2018/0107926 A1* | 4/2018 | Choi | ............... | G06N 3/0472 |
| 2019/0020875 A1* | 1/2019 | Liu | ............... | H04N 19/192 |
| 2019/0354842 A1* | 11/2019 | Louizos | ............... | G06N 3/0454 |
| 2019/0392323 A1* | 12/2019 | Yan | ............... | G06N 3/082 |

FOREIGN PATENT DOCUMENTS

| | | |
|---|---|---|
| CN | 106897734 A | 6/2017 |
| WO | 2016168219 A1 | 10/2016 |

OTHER PUBLICATIONS

Extended European Search Report issued in EP 18859380.0, dated Oct. 19, 2020.

Adaptive Time Slicing Quantization, Apr. 9, 2016 (Apr. 9, 2016), XP055735942, Retrieved from the internet URL:https://web.archive.org/web/20160409001054/http://judge.u-aizu.ac.jp/onlinejudge/description.jsp?id=2143 [retrieved on Oct. 1, 2020].

Lin et al., Fixed Point Quantization of Deep Convolutional Networks, Nov. 19, 2015 (Nov. 19, 2015), pp. 1-10, XP055284812, Retrieved from the Internet: URL:https://arxiv.org/pdf/1511.06393v3.pdf [retrieved on Jun. 30, 2016].

Quantization Step—an overview, Jan. 1, 2005 (Jan. 1, 2005), XP055735949, Retrieved from the internet URL:https://www.sciencedirect.com/topics/engineering/quantization-step [retrieved on Oct. 1, 2020].

* cited by examiner dividing, along the depth direction of the activation volume, the activation volume according to a preset depth interval to obtain a plurality of slice groups with equal depth interval.

DEEP NEURAL NETWORK-BASED METHOD AND DEVICE FOR QUANTIFYING ACTIVATION AMOUNT

The present application claims the priority to a Chinese patent application No. 201710859537.7, filed with the China National Intellectual Property Administration on Sep. 21, 2017 and entitled "Deep Neural Network-Based Method and Device for Quantifying Activation Amount", which is incorporated herein by reference in its entirety.

TECHNICAL FIELD

The present application relates to the technical field of machine learning, and in particular to a method and an apparatus for quantizing an activation volume of a deep neural network.

BACKGROUND

The deep neural network, as an emerging field in machine learning research, may parse data by simulating the mechanism of human brain, which is an intelligent model for analyzing and learning by establishing and simulating the human brain. At present, the deep neural network, such as convolutional neural network, recurrent neural network, and long short term memory network, has been well applied in terms of object detection and segmentation, behavior detection and recognition, and speech recognition or the like. However, since a large amount of data are involved in operations in each network layer of a deep neural network, thus the computational complexity is high and powerful bandwidth resources are required.

With respect to the above problem, for the related deep neural network, an idea of quantizing and compressing the activation volume of the deep neural network to a low number of bits is proposed. Through quantization, floating-point data with a large number of bits is quantized into fixed-point data with a lower number of bits. Since the quantized fixed-point data has a lower number of bits, the amount of data involved in operations can be reduced, thereby reducing the computational complexity of the deep neural network and the requirement for platform bandwidth.

In the above related deep neural network, the method for quantizing the activation volume of each network layer in the deep neural network can be summarized with mathematical symbols as $q_i$=quantization$_l(a_i)$, wherein quantization$_l(a_i)$ is a quantizer for quantizing the activation volume of the l-th network layer, a represents an element value of the original activation volume in each network layer, $q_i$ represents a quantized element value. According to the above mathematical symbols, the activation volume of each network layer is directly quantized globally. However, due to the large difference among elements in the activation volume, if global quantization is performed directly, that is all the elements of the activation volume in the layer are quantized by using the same quantization parameter, a large quantization error will be caused.

SUMMARY

The objective of the embodiments of the present application is to provide a method and an apparatus for quantizing an activation volume of a deep neural network, so as to reduce the quantization error. The specific technical solutions are as follows.

In the first aspect, an embodiment of the present application provides a method for quantizing an activation volume of a deep neural network, including:

obtaining an activation volume of a network layer in the deep neural network, wherein elements in the activation volume are arranged in three directions: a height direction, a width direction, and a depth direction;

dividing depth segments in the activation volume in which a difference among element features is smaller than a preset threshold into one slice group along the depth direction of the activation volume, so as to obtain a plurality of slice groups; and quantizing each slice group respectively by using a quantization parameter corresponding to each slice group obtained by using a quantization formula.

Optionally, dividing depth segments in the activation volume in which a difference among element features is smaller than a preset threshold into one slice group along the depth direction of the activation volume, so as to obtain a plurality of slice groups includes:

dividing, along the depth direction of the activation volume, the activation volume according to a preset depth interval to obtain a plurality of slice groups with equal depth interval.

Optionally, dividing depth segments in the activation volume in which a difference among element features is smaller than a preset threshold into one slice group along the depth direction of the activation volume, so as to obtain a plurality of slice groups includes:

obtaining an element feature of each depth segment in the activation volume; and dividing depth segments in which the difference among element features is smaller than the preset threshold into one slice group, so as to obtain a plurality of slice groups.

Optionally, the quantization parameter includes a quantization step.

Quantizing each slice group respectively by using a quantization parameter corresponding to each slice group obtained by using a quantization formula comprises:

obtaining a quantization step of each slice group by using the quantization formula according to a preset maximum quantization value and a preset number of bits corresponding to each slice group, wherein the quantization formula is:

$$\text{step} = \frac{A}{2^B - 1},$$

wherein, step is the quantization step, A is the preset maximum quantization value, and B is the preset number of bits;

quantizing each slice group respectively by using the quantization step of each slice group.

In the second aspect, an embodiment of the present application provides an apparatus for quantizing an activation volume of a deep neural network, including:

an obtaining module, configured for obtaining an activation volume of a network layer in the deep neural network, wherein elements in the activation volume are arranged in three directions: a height direction, a width direction, and a depth direction;

a dividing module, configured for dividing depth segments in the activation volume in which a difference among element features is smaller than a preset threshold into one slice group along the depth direction of the activation volume, so as to obtain a plurality of slice groups; and a quantization module, configured for quantizing each slice group respectively by using a quantization parameter corresponding to each slice group obtained by using a quantization formula.

Optionally the dividing module is specifically configured for:

dividing, along the depth direction of the activation volume, the activation volume according to a preset depth interval to obtain a plurality of slice groups with equal depth interval.

Optionally the dividing module is specifically configured for:

obtaining an element feature of each depth segment in the activation volume; and dividing depth segments in which the difference among element features is smaller than the preset threshold into one slice group, so as to obtain a plurality of slice groups.

Optionally, the quantization parameter includes a quantization step.

The quantization module is specifically configured for:

obtaining a quantization step of each slice group by using the quantization formula according to a preset maximum quantization value and a preset number of bits corresponding to each slice group, wherein the quantization formula is:

$$\text{step} = \frac{A}{2^B - 1},$$

wherein, step is the quantization step, A is the preset maximum quantization value, and B is the preset number of bits;

quantizing each slice group respectively by using the quantization step of each slice group.

In the third aspect, an embodiment of the present application provides a storage medium with executable codes stored thereon, wherein the executable code codes are, when executed, configured for carrying out the method for quantizing an activation volume of a deep neural network according to the first aspect of the embodiment of the present application.

In the fourth aspect, an embodiment of the present application provides an application program, which is, when executed, configured for carrying out the method for quantizing an activation volume of a deep neural network according to the first aspect of the embodiment of the present application.

In the fifth aspect, an embodiment of the present application provides a computer device including a processor and a storage medium, wherein, the storage medium is configured for storing executable code;

the processor is configured for carrying out the method for quantizing an activation volume of a deep neural network according to the first aspect of the embodiment of the present application when executing the executable code stored in the storage medium.

In view of above, in the solutions of the embodiments of the present embodiment, for each network layer in the deep neural network, depth segments in the activation volume in which the difference among element features is smaller than the preset threshold are divided into the same slice group along the depth direction of the activation volume of the network layer, so as to obtain a plurality of slice groups. Each slice group is then quantized by using the quantization method, thus the quantization of the activation volume is implemented. Since the element values of the activation volume are greatly different along the depth direction, by dividing the activation volume along the depth direction, the difference among element values in the same slice group is small, and each slice group has its own quantization step. That is to say, the quantization manner of each slice group is different, so that the quantization error caused by using the same quantization parameter to quantize all elements in the activation volume can be reduced.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

In order to make objectives, technical solutions and advantages of the present application more apparent, the present application will be described in detail with reference to the accompanying drawings and by way of examples. Obviously, the embodiments described are only some of the embodiments of the present application instead of all of them. All other embodiments obtained by those of ordinary skills in the art based on the embodiments herein without any creative efforts are within the scope of the present application.

The present application will be described in detail below according to specific embodiments.

In order to reduce the quantization error, embodiments of the present application provide a method and an apparatus for quantizing an activation volume of a deep neural network. The method for quantizing an activation volume of a deep neural network according to the embodiment of the present application will be first introduced below.

An entity for performing the method for quantizing an activation volume of a deep neural network according to the embodiment of the present application may be a computer device that implements functions such as target detection and segmentation, behavior detection and recognition, and speech recognition, etc., or may be a camera with functions such as target detection and segmentation, behavior detection and recognition, etc., or may also be a microphone with voice recognition function, and the entity includes at least a core chip with data processing capacity. A manner for implementing the method for quantizing an activation volume of a deep neural network according to the embodiment of the present application may be at least one of software, a hardware circuit, and a logic circuit provided in the entity.

Figure 1:
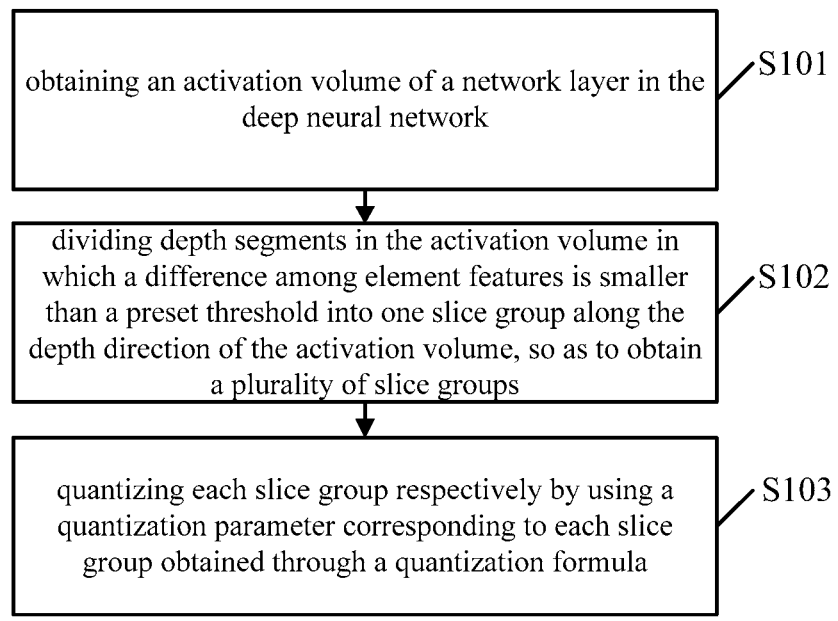
FIG. 1 is a schematic flowchart of a method for quantizing an activation volume of a deep neural network according to an embodiment of the present application.

As shown in FIG. 1, the method for quantizing an activation volume of a deep neural network according to the embodiment of the present application is shown, and this method may include following steps.

S101: obtaining an activation volume of a network layer in the deep neural network.

Figure 2:
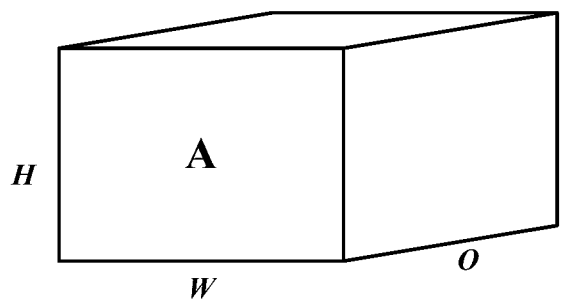
FIG. 2 is a schematic diagram of activation volume in a deep neural network according to an embodiment of the present application.

Elements in the activation volume are arranged in three directions: height, width, and depth. The activation volume in a deep neural network is an input/output of a convolution layer, or an input/output of an inner product layer, or an input/output of a linearly modified Relu layer, or an input/output of a batch normalization layer, or an input/output of a scale layer, or an input/output of a concat layer, etc., which is summarized as data flow transmitted between layers in the network when running a deep neural network model. As shown in FIG. 2, the size of the activation volume A is W×H×O. DNN (Deep Neural Network) is a relatively broad data processing method. Specifically, DNN may be any one of CNN (Convolutional Neural Network), RNN (Recurrent Neural Network), LSTM (Long Short Term Memory) and other data processing methods.

S102: dividing depth segments in the activation volume in which a difference among element features is smaller than a preset threshold into one slice group along the depth direction of the activation volume, so as to obtain a plurality of slice groups.

Considering that element values of the activation volume are greatly different along the depth direction, if the activation volume is directly quantized using a same quantization parameter, a large quantization error would be caused. Therefore, the activation volume is divided along the depth direction to obtain a plurality of slice groups. The activation volume may be divided according to a preset depth interval, or may be divided by performing statistics on element features.

Optionally, S102 may specifically include:

along the depth direction of the activation volume, dividing the activation volume according to a preset depth interval to obtain a plurality of slice groups with equal depth interval.

Since the difference among element values of two adjacent depth segments is often small, the activation volume may be divided according to a preset depth interval. Specifically, an equal depth interval division manner may be employed. The total depth of the activation volume can be exactly divided by the depth of each slice group obtained by division.

Optionally, S102 may also specifically include:

obtaining an element feature of each depth segment in the activation volume;

dividing depth segments in which the difference among element features is smaller than the preset threshold into one slice group, so as to obtain a plurality of slice groups.

The activation volume is divided by performing statistics on the element features, which may be dividing depth segments in which the difference among element features is smaller than the preset threshold into one slice group, based on a metric reference of the maximum value or average value or variance of element values of each depth segment along the depth direction of the activation volume.

S103: quantizing each slice group respectively by using a quantization parameter corresponding to each slice group obtained through a quantization formula.

Based on the plurality of slice groups obtained by division, each slice group respectively obtains a corresponding quantization parameter by calculation with the quantization formula. The quantization parameter is a parameter used to quantize the slice group, and may be a quantization step for quantization.

Optionally, the quantization parameter may include a quantization step.

S103 may specifically include:

obtaining a quantization step of each slice group by using the quantization formula according to a preset maximum quantization value and a preset number of bits corresponding to each slice group, wherein the quantization formula is shown in formula (1):

$$\text{step} = \frac{A}{2^B - 1} \quad (1)$$

step is the quantization step, A is the preset maximum quantization value, and B is the preset number of bits;

quantizing each slice group respectively by using the quantization step of each slice group.

For each slice group, the preset number of bits B is the same, which is preset and expected to be achieved after quantization. For example, the preset number of bits B may be any integer in the range of 1 to 32. Since the preset maximum quantization value corresponding to each slice group is different, the calculated quantization step is also different, that is, each slice group is quantized by using its own quantization parameter.

The quantization parameter may also be a quantizer obtained based on element values in a slice group and the preset number of bits of a quantization result desired to be achieved after quantization. For example, the preset number of bits may be any integer in the range of 1 to 32, and the quantizer may be implemented as any reasonable quantizer, such as an uniform quantizer shown in formula (2):

$$q_i = \text{Clip}\left(\text{round}\left(\frac{a_i}{\text{step}}\right) * \text{step}, \text{minV}, \text{maxV}\right) \quad (2)$$

wherein, step is the quantization step, minV is the preset minimum quantization value corresponding to the slice group, maxV is the preset maximum quantization value corresponding to the slice group, and $a_i$ represents each element in the slice group, and Clip function is shown in formula (3).

$$\text{Clip}(x, \min, \max) = \begin{cases} 0 & x \leq \min \\ \max - 1 & x \geq \max \\ x & \min < x < \max \end{cases} \quad (3)$$

When applying the present embodiment, for each network layer in the deep neural network, depth segments in the activation volume in which the difference among element features is smaller than the preset threshold are divided into the same slice group along the depth direction of the activation volume of the network layer, so as to obtain a plurality of slice groups. Each slice group is then quantized by using the quantization method, thus the quantization of the activation volume is implemented. Since the element values of the activation volume are greatly different along the depth direction, by dividing the activation volume along the depth direction, the difference among element values in the same slice group is small, and each slice group has its own quantization step. That is to say, the quantization manner of each slice group is different, so that the quantization error caused by using the same quantization parameter to quantize all elements in the activation volume can be reduced.

In order to facilitate understanding, the method for quantizing an activation volume of a deep neural network according to the embodiment of the present application is introduced below with reference to a specific example.

Figure 3:
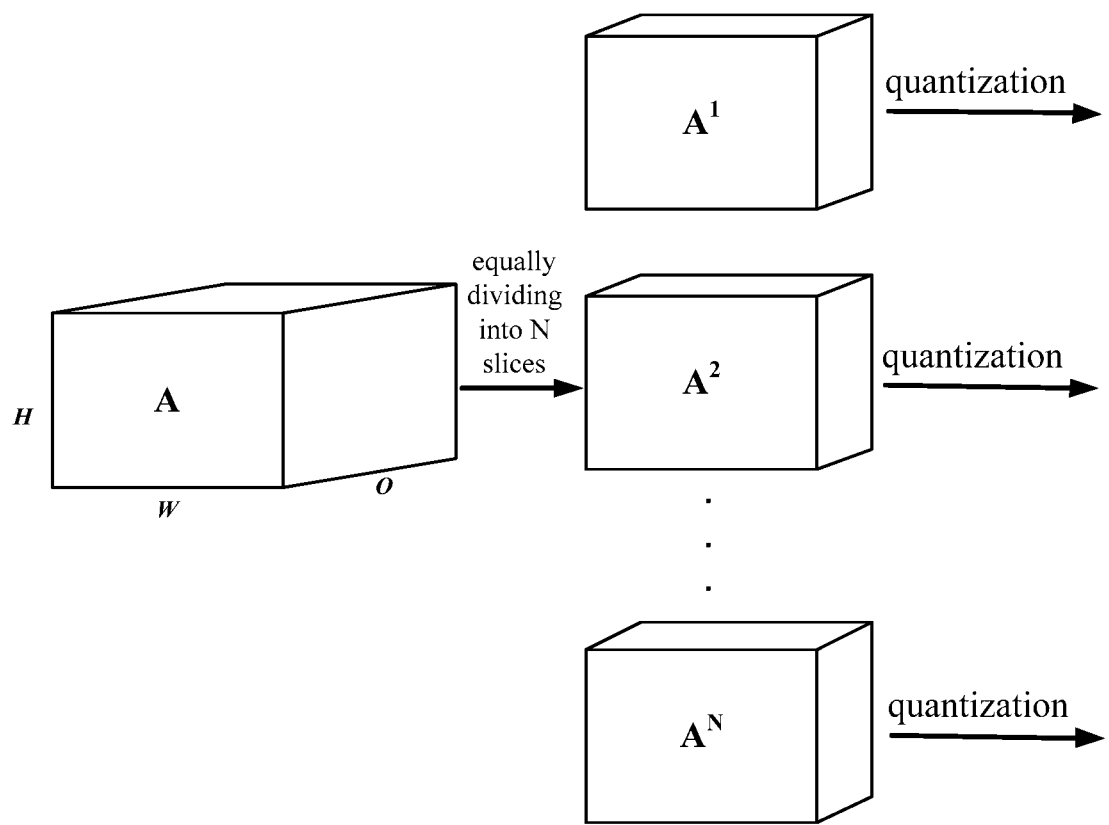
FIG. 3 is a schematic diagram of grouping and quantizing activation volume of a network layer in a deep neural network according to an embodiment of the present application.

As shown in FIG. 3, FIG. 3 is a schematic diagram of grouping and quantizing the activation volume of each network layer in a deep neural network according to an embodiment of the present application. Specifically, the quantization method includes following steps.

In the first step, along the depth direction of the activation volume of a network layer, the activation volume is divided according to a preset depth interval to obtain a plurality of slice groups with equal depth interval.

Since the difference among element features of two adjacent depth segments in the activation volume of the network layer is small, in the process of dividing the activation volume to obtain the slice groups, the adjacent depth segments may be divided into one slice group. In addition, in order to ensure the consistency of data, the depth of each slice group obtained by division is the same, which can be implemented by using an equal depth interval division manner, that is, the total depth of the activation volume can be exactly divided by the preset depth interval of each slice group obtained by division. As shown in FIG. 3, after the activation volume A is equally divided into N parts, N slice groups with the same depth are obtained.

In the second step, the maximum value is extracted from element absolute values in each slice group, and a preset maximum quantization value corresponding to each slice group is determined based on the maximum value, and a preset minimum quantization value is set to 0.

For each slice group, the preset maximum quantization value corresponding to the n-th slice group is $A^n=2^M$, wherein $M=\text{ceil}(\log_2 \max|a_i^n|)$ is the smallest integer greater than or equal to the expression $\log_2 \max|a_i^n|$, $\max|a_i^n|$ is the maximum value among the element absolute values in the n-th slice group, and $a_i^n$ represents each element in the n-th slice group.

In the third step, a quantization step of each slice group is obtained by using a quantization formula according to the preset maximum quantization value and a preset number of bits corresponding to each slice group.

The quantization formula is shown in formula (4):

$$\text{step}^n = \frac{A^n}{2^B - 1} \quad (4)$$

wherein $\text{step}^n$ is the quantization step of the n-th slice group, $A^n$ is the preset maximum quantization value corresponding to the n-th slice group, and B is the preset number of bits. For each slice group, the preset number of bits B is the same, which is preset and excepted to be achieved after quantization. For example, the preset number of bits B may be any integer in the range of 1 to 32. Since the preset maximum quantization value corresponding to each slice group is different, the calculated quantization step is also different, that is, each slice group is quantized by using its own quantization parameter.

In the fourth step, each slice group is quantized respectively based the quantization step of each slice group.

When applying the present solution, for each network layer in the deep neural network, depth segments in the activation volume in which the difference among element features is smaller than the preset threshold are divided into the same slice group along the depth direction of the activation volume of the network layer, so as to obtain a plurality of slice groups. Each slice group is then quantized by using the quantization method, thus the quantization of the activation volume is implemented. Since the element values of the activation volume are greatly different along the depth direction, by dividing the activation volume along the depth direction, the difference among element values in the same slice group is small, and each slice group has its own quantization step. That is to say, the quantization manner of each slice group is different, so that the quantization error caused by using the same quantization parameter to quantize all elements in the activation volume can be reduced.

Figure 4:
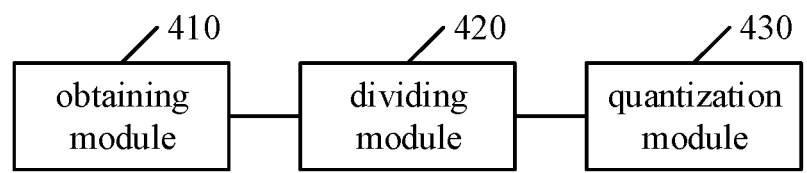
FIG. 4 is a schematic structural diagram of an apparatus for quantizing an activation volume of a deep neural network according to an embodiment of the present application.

Corresponding to the above method embodiment, an embodiment of the present application provides an apparatus for quantizing an activation volume of a deep neural network, as shown in FIG. 4, the apparatus includes:

an obtaining module 410, configured for obtaining an activation volume of a network layer in the deep neural network, wherein elements in the activation volume are arranged in three directions: a height direction, a width direction, and a depth direction;

a dividing module 420, configured for dividing depth segments in the activation volume in which a difference among element features is smaller than a preset threshold into one slice group along the depth direction of the activation volume, so as to obtain a plurality of slice groups; and a quantization module 430, configured for quantizing each slice group respectively by using a quantization parameter corresponding to each slice group obtained by using a quantization formula.

Optionally the dividing module 420 is specifically configured for:

dividing, along the depth direction of the activation volume, the activation volume according to a preset depth interval to obtain a plurality of slice groups with equal depth interval.

Optionally the dividing module 420 is specifically further configured for:

obtaining an element feature of each depth segment in the activation volume; and dividing depth segments in which the difference among element features is smaller than the preset threshold into one slice group, so as to obtain a plurality of slice groups.

Optionally, the quantization parameter includes a quantization step.

The quantization module 430 is specifically configured for:

obtaining a quantization step of each slice group by using the quantization formula according to a preset maximum quantization value and a preset number of bits corresponding to each slice group, wherein the quantization formula is:

$$\text{step} = \frac{A}{2^B - 1},$$

wherein, step is the quantization step, A is the preset maximum quantization value, and B is the preset number of bits;

quantizing each slice group respectively by using the quantization step of each slice group.

When applying the present embodiment, for each network layer in the deep neural network, depth segments in the activation volume in which the difference among element features is smaller than the preset threshold are divided into the same slice group along the depth direction of the activation volume of the network layer, so as to obtain a plurality of slice groups. Each slice group is then quantized by using the quantization method, thus the quantization of the activation volume is implemented. Since the element values of the activation volume are greatly different along the depth direction, by dividing the activation volume along the depth direction, the difference among element values in the same slice group is small, and each slice group has its own quantization step. That is to say, the quantization manner of each slice group is different, so that the quantization error caused by using the same quantization parameter to quantize all elements in the activation volume can be reduced.

In addition, corresponding to the method for quantizing an activation volume of a deep neural network according to the above embodiment, an embodiment of the present application provides a storage medium for storing executable code, wherein the executable code is used to, when executed, carry out the method for quantizing an activation volume of a deep neural network according to the embodiment of the present application. Specifically, the method for quantizing an activation volume of a deep neural network may include:

obtaining an activation volume of a network layer in the deep neural network, wherein elements in the activation volume are arranged in three directions: a height direction, a width direction, and a depth direction;

dividing depth segments in the activation volume in which a difference among element features is smaller than a preset threshold into one slice group along the depth direction of the activation volume, so as to obtain a plurality of slice groups; and quantizing each slice group respectively by using a quantization parameter corresponding to each slice group obtained by using a quantization formula.

In the present embodiment, the storage medium stores the executable code that carries out the method for quantizing an activation volume of a deep neural network according to the embodiment of the present application when being executed, which can implements: for each network layer in the deep neural network, dividing depth segmenta in the activation volume in which the difference among element features is smaller than the preset threshold into the same slice group along the depth direction of the activation volume of the network layer, so as to obtain a plurality of slice groups; and quantizing each slice group by using the quantization method, thus the quantization of the activation volume is achieved. Since the element values of the activation volume are greatly different along the depth direction, by dividing the activation volume along the depth direction, the difference among element values in the same slice group is small, and each slice group has its own quantization step. That is to say, the quantization manner of each slice group is different, so that the quantization error caused by using the same quantization parameter to quantize all elements in the activation volume can be reduced.

In addition, corresponding to the method for quantizing an activation volume of a deep neural network according to the above embodiment, an embodiment of the present application provides an application program, which is used to, when executed, carry out the method for quantizing an activation volume of a deep neural network according to the embodiment of the present application. Specifically, the method for quantizing an activation volume of a deep neural network according to the embodiment of the present application may include:

obtaining an activation volume of a network layer in the deep neural network, wherein elements in the activation volume are arranged in three directions: a height direction, a width direction, and a depth direction;

dividing depth segments in the activation volume in which a difference among element features is smaller than a preset threshold into one slice group along the depth direction of the activation volume, so as to obtain a plurality of slice groups; and quantizing each slice group respectively by using a quantization parameter corresponding to each slice group obtained by using a quantization formula.

In the present embodiment, the application program carries out the method for quantizing an activation volume of a deep neural network according to the embodiment of the present application when being executed, which can implements: for each network layer in the deep neural network, dividing depth segments in the activation volume in which the difference among element features is smaller than the preset threshold into the same slice group along the depth direction of the activation volume of the network layer, so as to obtain a plurality of slice groups; and quantizing each slice group by using the quantization method, thus the quantization of the activation volume is achieved. Since the element values of the activation volume are greatly different along the depth direction, by dividing the activation volume along the depth direction, the difference among element values in the same slice group is small, and each slice group has its own quantization step. That is to say, the quantization manner of each slice group is different, so that the quantization error caused by using the same quantization parameter to quantize all elements in the activation volume can be reduced.

Figure 5:
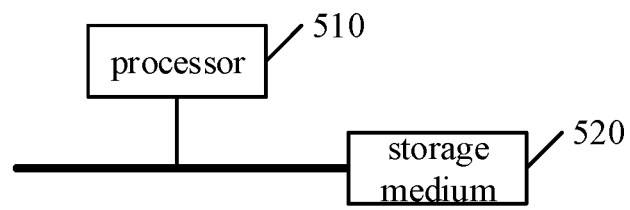
FIG. 5 is a schematic structural diagram of a computer device according to an embodiment of the present application.

In addition, corresponding to the method for quantizing an activation volume of a deep neural network according to the above embodiment, an embodiment of the present application provides a computer device, as shown in FIG. 5, including a processor 510 and a storage medium 520, wherein, the storage medium 520 is configured for storing executable code;

the processor 510 is configured for performing following steps when executing the executable code stored in the storage medium 520:

obtaining an activation volume of a network layer in the deep neural network, wherein elements in the activation volume are arranged in three directions: a height direction, a width direction, and a depth direction;

dividing depth segments in the activation volume in which a difference among element features is smaller than a preset threshold into one slice group along the depth direction of the activation volume, so as to obtain a plurality of slice groups; and quantizing each slice group respectively by using a quantization parameter corresponding to each slice group obtained by using a quantization formula.

Optionally, when performing the step of dividing depth segments in the activation volume in which a difference among element features is smaller than a preset threshold into one slice group along the depth direction of the activation volume, so as to obtain a plurality of slice groups, the processor 510 is specifically configured for:

dividing, along the depth direction of the activation volume, the activation volume according to a preset depth interval to obtain a plurality of slice groups with equal depth interval.

Optionally, when performing the step of dividing depth segments in the activation volume in which a difference among element features is smaller than a preset threshold into one slice group along the depth direction of the activation volume, so as to obtain a plurality of slice groups, the processor 510 is specifically further configured for:

obtaining an element feature of each depth segment in the activation volume; and dividing depth segments in which the difference among element features is smaller than the preset threshold into one slice group, so as to obtain a plurality of slice groups.

Optionally, the quantization parameter includes a quantization step.

When performing the step of quantizing each slice group respectively by using a quantization parameter corresponding to each slice group obtained by using a quantization formula, the processor 510 is specifically configured for:

obtaining a quantization step of each slice group by using the quantization formula according to a preset maximum quantization value and a preset number of bits corresponding to each slice group, wherein the quantization formula is:

$$\text{step} = \frac{A}{2^B - 1},$$

wherein, step is the quantization step, A is the preset maximum quantization value, and B is the preset number of bits;

quantizing each slice group respectively by using the quantization step of each slice group.

Data can be transmitted between the storage medium 520 and the processor 510 through a wired connection or a wireless connection, and the computer device can communicate with other devices through a wired communication interface or a wireless communication interface.

The above storage medium may include an RAM (Random Access Memory), and may also include a NVM (Nonvolatile memory), such as at least one disk memory. Optionally, the storage medium may also be at least one storage device located away from the processor.

The above processor may be a general purpose processor, including a CPU (Central Processing Unit), an NP (Network Processor), etc.; it may also be a DSP (Digital Signal Processor), an ASIC (Application Specific Integrated Circuit), an FPGA (Field-Programmable Gate Array) or other programmable logic devices, discrete gates or transistor logic devices, discrete hardware components.

In the present embodiment, the processor of the computer device executes a program corresponding to the executable code by reading the executable code stored in the storage medium, and the program carries out the method for quantizing an activation volume of a deep neural network according to the embodiment of the present application when being executed, which can implements: for each network layer in the deep neural network, dividing depth segments in the activation volume in which the difference among element features is smaller than the preset threshold into the same slice group along the depth direction of the activation volume of the network layer, so as to obtain a plurality of slice groups; and quantizing each slice group by using the quantization method, thus the quantization of the activation volume is achieved. Since the element values of the activation volume are greatly different along the depth direction, by dividing the activation volume along the depth direction, the difference among element values in the same slice group is small, and each slice group has its own quantization step. That is to say, the quantization manner of each slice group is different, so that the quantization error caused by using the same quantization parameter to quantize all elements in the activation volume can be reduced.

The embodiments of the computer device, application program and storage medium are described briefly since they are substantially similar to the above method embodiment, and the related parts can be referred to the corresponding description of the method embodiment.

It should be noted that the relationship terms used herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. In particular, the embodiment of the system is described briefly since it is substantially similar to the method embodiment, and the related parts can be referred to the corresponding description of the method embodiment.

The embodiments described above are simply preferable embodiments of the present application, and are not intended to limit the present application. Any modifications, alternatives, improvements, or the like within the spirit and principle of the present application shall be included within the scope of protection of the present application.

What is claimed is:

1. A method for quantizing an activation volume of a deep neural network performed by a computer device having a processor and a non-transitory storage medium that stores executable code, comprising:

obtaining, by the processor, an activation volume of a network layer in the deep neural network, wherein elements in the activation volume are arranged in three directions: a height direction, a width direction, and a depth direction;

dividing, by the processor, depth segments in the activation volume in which a difference among element features is smaller than a preset threshold into one slice group along the depth direction of the activation volume, so as to obtain a plurality of slice groups;

quantizing, by the processor, each slice group respectively by using a quantization parameter corresponding to each slice group obtained by using a quantization formula, wherein different slice groups correspond to different quantization parameters, and wherein the quantization parameter comprises a quantization step;

quantizing each slice group respectively by using a quantization parameter corresponding to each slice group obtained by using a quantization formula comprises:

obtaining the quantization step of each slice group by using the quantization formula according to a preset maximum quantization value and a preset number of bits corresponding to each slice group, wherein the quantization formula is:

$$step = \frac{A}{2^B - 1},$$

wherein, step is the quantization step, A is the preset maximum quantization value, and B is the preset number of bits;

quantizing each slice group respectively by using the quantization step of each slice group; and performing, by the processor, target detection and segmentation, behavior detection and recognition, or speech recognition using each quantized slice group.

2. The method of claim 1, wherein dividing, by the processor, depth segments in the activation volume in which a difference among element features is smaller than a preset threshold into one slice group along the depth direction of the activation volume, so as to obtain a plurality of slice groups comprises:

dividing, along the depth direction of the activation volume, the activation volume according to a preset depth interval to obtain a plurality of slice groups with equal depth interval.

3. The method of claim 1, wherein dividing, by the processor, depth segments in the activation volume in which a difference among element features is smaller than a preset threshold into one slice group along the depth direction of the activation volume, so as to obtain a plurality of slice groups comprises:

obtaining an element feature of each depth segment in the activation volume; and dividing depth segments in which the difference among element features is smaller than the preset threshold into one slice group, so as to obtain a plurality of slice groups.

4. A non-transitory computer readable storage medium with executable codes stored thereon, wherein the executable codes are, when executed, configured for carrying out a method for quantizing an activation volume of a deep neural network, the method comprises:

obtaining an activation volume of a network layer in the deep neural network, wherein elements in the activation volume are arranged in three directions: a height direction, a width direction, and a depth direction;

dividing depth segments in the activation volume in which a difference among element features is smaller than a preset threshold into one slice group along the depth direction of the activation volume, so as to obtain a plurality of slice groups;

quantizing each slice group respectively by using a quantization parameter corresponding to each slice group obtained by using a quantization formula, wherein different slice groups correspond to different quantization parameters, and wherein the quantization parameter comprises a quantization step;

quantizing each slice group respectively by using a quantization parameter corresponding to each slice group obtained by using a quantization formula comprises:

obtaining the quantization step of each slice group by using the quantization formula according to a preset maximum quantization value and a preset number of bits corresponding to each slice group, wherein the quantization formula is:

$$step = \frac{A}{2^B - 1},$$

wherein, step is the quantization step, A is the preset maximum quantization value, and B is the preset number of bits;

quantizing each slice group respectively by using the quantization step of each slice group; and performing target detection and segmentation, behavior detection and recognition, or speech recognition using each quantized slice group.

5. A computer device, comprising a processor and a non-transitory storage medium, wherein, the storage medium is configured for storing executable code;

the processor is configured for carrying out a method for quantizing an activation volume of a deep neural network when executing the executable code stored in the storage medium, the method comprises:

obtaining, by the processor, an activation volume of a network layer in the deep neural network, wherein elements in the activation volume are arranged in three directions: a height direction, a width direction, and a depth direction;

dividing, by the processor, depth segments in the activation volume in which a difference among element features is smaller than a preset threshold into one slice group along the depth direction of the activation volume, so as to obtain a plurality of slice groups;

quantizing, by the processor, each slice group respectively by using a quantization parameter corresponding to each slice group obtained by using a quantization formula, wherein different slice groups correspond to different quantization parameters, and wherein the quantization parameter comprises a quantization step;

quantizing each slice group respectively by using a quantization parameter corresponding to each slice group obtained by using a quantization formula comprises:

obtaining the quantization step of each slice group by using the quantization formula according to a preset maximum quantization value and a preset number of bits corresponding to each slice group, wherein the quantization formula is:

$$step = \frac{A}{2^B - 1},$$

wherein, step is the quantization step, A is the preset maximum quantization value, and B is the preset number of bits;

quantizing each slice group respectively by using the quantization step of each slice group; and performing, by the processor, target detection and segmentation, behavior detection and recognition, or speech recognition using each quantized slice group.

6. The non-transitory computer readable storage medium of claim 4, wherein dividing depth segments in the activation volume in which a difference among element features is smaller than a preset threshold into one slice group along the depth direction of the activation volume, so as to obtain a plurality of slice groups comprises:

dividing, along the depth direction of the activation volume, the activation volume according to a preset depth interval to obtain a plurality of slice groups with equal depth interval.

7. The non-transitory computer readable storage medium of claim 4, wherein dividing depth segments in the activation volume in which a difference among element features is smaller than a preset threshold into one slice group along the depth direction of the activation volume, so as to obtain a plurality of slice groups comprises:

obtaining an element feature of each depth segment in the activation volume; and dividing depth segments in which the difference among element features is smaller than the preset threshold into one slice group, so as to obtain a plurality of slice groups.

8. The computer device of claim 5, wherein dividing depth segments in the activation volume in which a difference among element features is smaller than a preset threshold into one slice group along the depth direction of the activation volume, so as to obtain a plurality of slice groups comprises:

dividing, along the depth direction of the activation volume, the activation volume according to a preset depth interval to obtain a plurality of slice groups with equal depth interval.

9. The computer device of claim 5, wherein dividing depth segments in the activation volume in which a difference among element features is smaller than a preset threshold into one slice group along the depth direction of the activation volume, so as to obtain a plurality of slice groups comprises:

obtaining an element feature of each depth segment in the activation volume; and dividing depth segments in which the difference among element features is smaller than the preset threshold into one slice group, so as to obtain a plurality of slice groups.

* * * * *